Jan. 21, 1958    R. L. WARING    2,820,687
UTILITY SHELF

Filed Nov. 16, 1955    2 Sheets-Sheet 1

INVENTOR.
Roger L. Waring
BY Dybvig and Jacox
HIS ATTORNEYS

Jan. 21, 1958 R. L. WARING 2,820,687
UTILITY SHELF
Filed Nov. 16, 1955 2 Sheets-Sheet 2
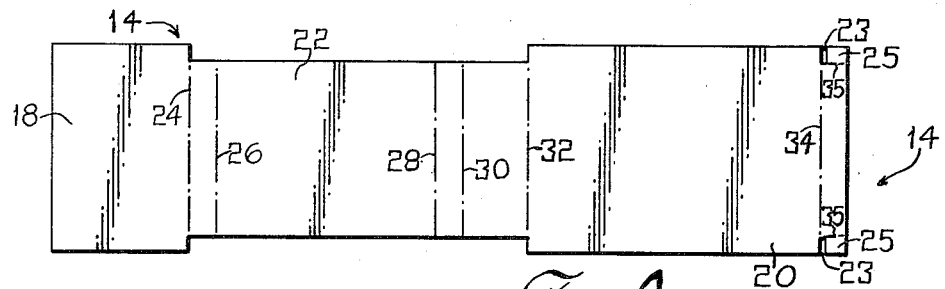
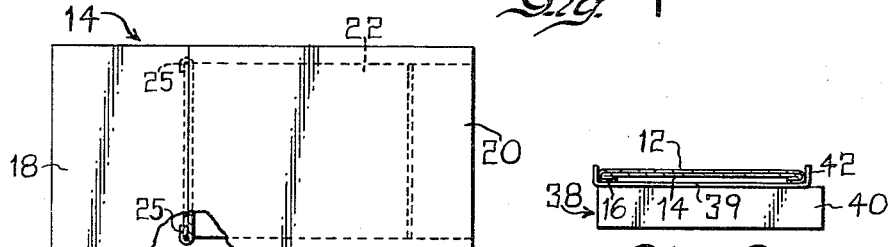
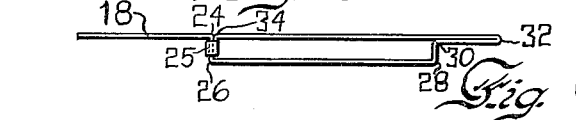
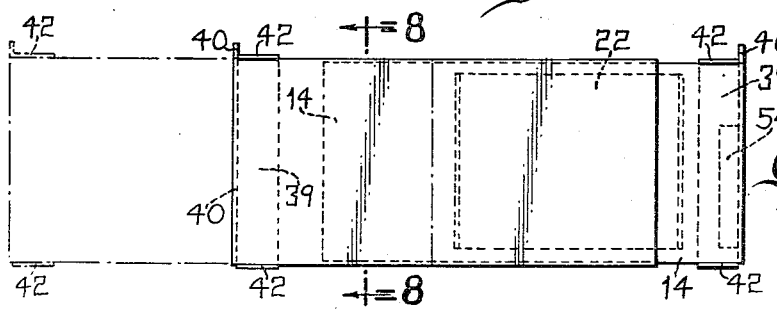
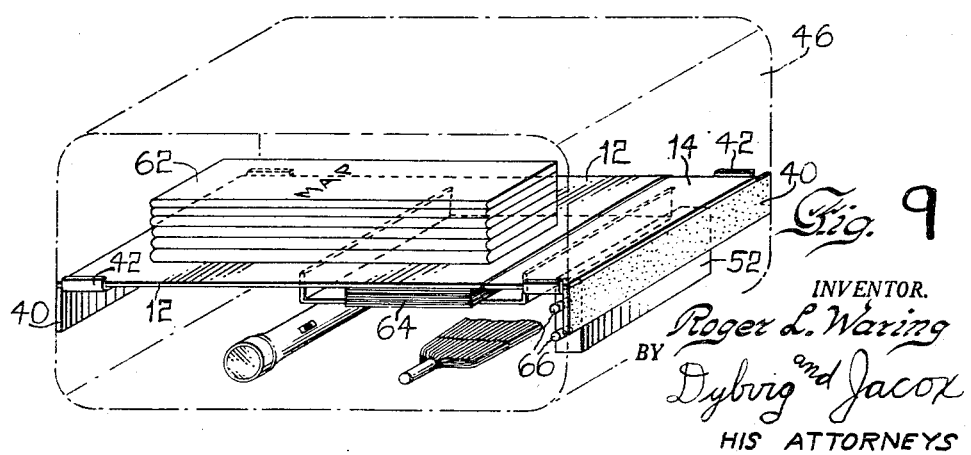
INVENTOR.
Roger L. Waring
BY Dybvig and Jacox
HIS ATTORNEYS

United States Patent Office 2,820,687
Patented Jan. 21, 1958

2,820,687
UTILITY SHELF
Roger L. Waring, Marion, Ohio
Application November 16, 1955, Serial No. 547,183
3 Claims. (Cl. 312—350)

This invention relates to a utility shelf. The invention relates more particularly to a utility shelf for a glove compartment of an automobile. This invention relates still more particularly to a utility shelf for glove compartments of automobiles which shelf is adjustable and adapted to be used with any conventional glove compartment. However, the invention is not so limited due to the fact that the utility shelf of this invention may be used for other purposes than for glove compartments of automobiles.

All who use automobiles are familiar with the fact that there are certain types of objects and materials which are usually carried within the glove compartment of an automobile. Furthermore, such material and objects stored within the glove compartment of an automobile usually are difficult to arrange neatly and in a manner so as to be readily removed from the compartment when desired. Therefore, it is highly desirable to have means within the glove compartment which is particularly adapted for retaining such articles and materials.

Hence an object of this invention is to provide a utility shelf for use in the glove compartments of automobiles which shelf is particularly adapted to retain various articles and materials which are usually kept within the glove compartment.

Another object of this invention is to provide a utility shelf for the glove compartment of automobiles, which utility shelf is adjustable and is adapted for use with any conventional glove compartment.

Another object of this invention is to provide a utility shelf for the glove compartment of an automobile which utility shelf may be easily installed within the glove compartment or removed therefrom.

Another object of this invention is to provide an adjustable utility shelf for the glove compartments of automobiles, which utility shelf may be produced by the formation of a minimum number of pieces so that the utility shelf may be produced at a relatively low cost.

Another object of this invention is to provide a utility shelf adaptable for general use which shelf is adjustable while remaining rigid, durable and long lived.

Other objects and advantages reside in the construction of parts, the combination thereof and the mode of operation, as will become more apparent from the following description.

In the drawings, Figure 1 is a perspective view showing a conventional glove compartment of an automobile with the utility shelf of this invention installed within the glove compartment.

Figure 4 is a top plan view showing a sheet of material cut for the forming of a section of the utility shelf of this invention.

Figure 5 is a top plan view showing the sheet of material of Figure 4 formed into one of the sections of the utility shelf of this invention.

Figure 6 is an elevational view taken substantially on line 6—6 of Figure 5.

Figure 7 is a top plan view showing the utility shelf of this invention.

Figure 8 is a sectional view taken substantially on line 8—8 of Figure 7.

Figure 9 is a perspective view showing the utility shelf of this invention installed within a glove compartment of an automobile with numerous articles ordinarily retained within the glove compartment.

Figure 1:
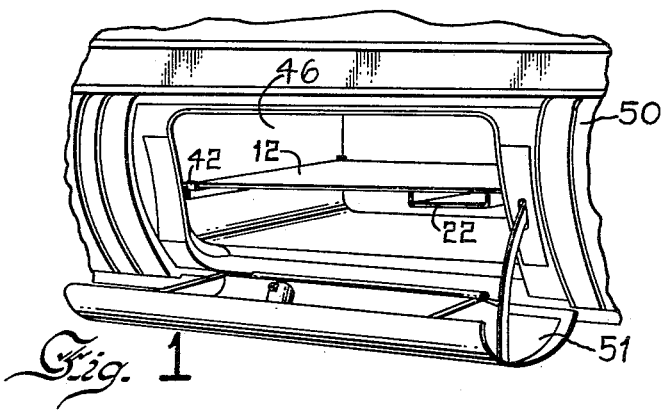

Referring to the drawings in detail, the utility shelf of this invention comprises a pair of sections of rigid sheet material. The sections herein being indicated by reference numerals 12 and 14. Section 12 is a substantially rectangular piece of sheet material having underturned side edge portions 16, which extend the length of the section 12. The section 14 comprises a sheet of material which is formed from a relatively thin sheet cut in the manner shown in Figure 4. The sheet of material of the section 14, as shown in Figure 4, has an end portion 18 having a given width. The sheet also is provided with a portion 20 at the other end thereof having the same width as the portion 18. Intermediate the portions 18 and 20 is a portion 22 having a lesser width than the width of portions 18 and 20. Adjacent the right hand end of the portion 20, as shown in Figure 4, are a pair of aligned transverse slots 23 which forms flaps 25 at the end of the portion 20. The sheet forming section 14 is bent along lines 24, 26, 28, 30, 32, 34 and 35 as shown in Figures 4 and 6.

The portion 22 is bent downwardly along the line 24, making a right angle bend along the line 24, thus making the part between the lines 24 and 26 vertical. Then the portion 22 is bent at a right angle along the line 26, thus making the part between lines 26 and 28 horizontal. The portion 22 is bent along the line 28 so that the part between lines 28 and 30 is vertical. Then the portion 22 is bent along the line 30 so that the part between the lines 30 and 32 is horizontal. Then the portion 20 is folded over the portion 22 along the line 32 so that the portion 20 extends horizontally. Thus, a part of the portion 20 lies in abutting relation with the part of the portion 22 intermediate the lines 30 and 32 while the remainder of portion 20 extends over the part of the portion 22 intermediate lines 26 and 28.

The portion 20 is then bent downwardly at a right angle along the lines 34, and flaps 25 are bent along lines 35 around the side edges of the vertical part of the portion 22 between the lines 24 and 26. The flaps 25 firmly embrace the side edges of the vertical part of the portion 22 between the lines 24 and 26.

Thus, the sheet comprising the section 14 is formed into a member having an upper surface and a lower surface firmly disposed in spaced relation, as shown in Figure 6.

Then the section 12 is joined to the section 14 by means of slidably inserting the portions 18 and 20 of the section 14 between the underturned side edge portions 16 and the main body of the section 12 so that the section 14 is held in engagement with the section 12 by means of the underturned side edge portions 16 of the section 12. Thus, the section 12 is slidably attached to the section 14, as shown in Figure 7.

Figure 2:
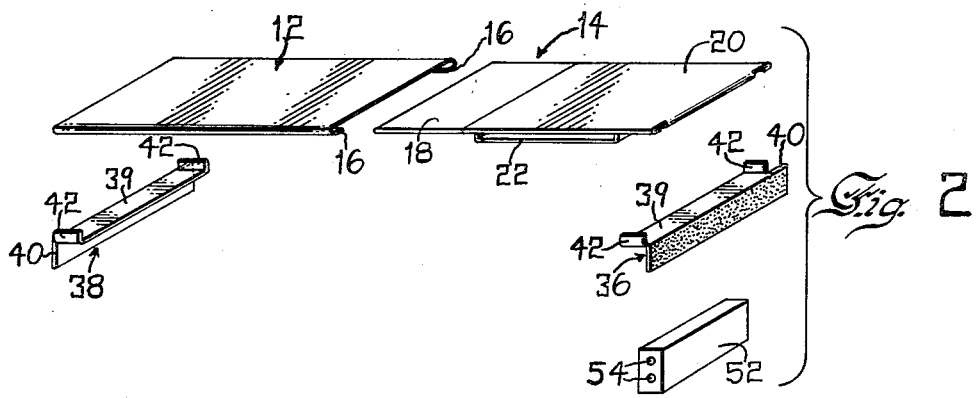
Figure 2 is a perspective exploded view showing the elements of the utility shelf of this invention.

A pair of elongate right angle support brackets 36 and 38, best shown in Figure 2, are provided for the purpose of supporting the slidably joined sections 12 and 14. Each of the support brackets 36 and 38 is provided with a horizontal extending leg 39 and a vertically extending leg 40, the leg 40 being slightly longer than the leg 39.

The horizontal leg 39 is provided at the ends thereof with upturned lugs 42. The left hand end of the section 12 is adapted to rest upon the horizontal leg 39 of the bracket 38 between lugs 42 thereof; the right hand end of the section 14 is adapted to rest upon the horizontal leg 39 of the bracket 36 between the lugs 42 thereof.

The outer surface of each of the vertical legs 40 is provided with any suitable adhesive material so that the brackets 36 and 38 may be adhesively attached to the inner side walls of a glove compartment, such as a glove compartment 46 shown in Figure 1. The glove compartment 46 is recessed within a panel 50 and is provided with a closure member 51. An elongate block member 52 is attached to the under surface of the bracket 36 and is in engagement with the legs 39 and 40 thereof, as shown in Figures 7 and 9. The block member 52 may be adhesively attached to the legs 39 and 40 of the bracket 36 or may be attached thereto by any other suitable means. The elongate block 52 is provided with a plurality of longitudinally extending holes 54 which are adapted to receive pencils or other writing instruments.

After the support brackets 36 and 38 are adhesively attached or are attached by any other suitable means within the glove compartment 46, the sections 12 and 14 which are slidably attached one to the other are placed within the glove compartment above the support brackets 36 and 38. The sections 12 and 14 are then slidably extended one with respect to the other between the side walls of the glove compartment so that an end of each of the sections 12 and 14 is adjacent the side walls and the slidably joined sections 12 and 14 rest upon the horizontal legs 39 of the support brackets 36 and 38. The lugs 42 of the horizontal legs 39 retain the sections 12 and 14 against slidable movement within the glove compartment.

Figure 3:
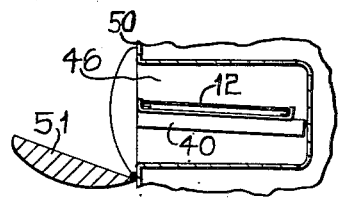
Figure 3 is an end cross sectional view showing the utility shelf of this invention installed within a glove compartment.

The support brackets 36 and 38 are horizontally inclined within the glove compartment 46, as shown in Figure 3, so that the sections 12 and 14 slope toward the rear wall of the glove compartment 46 in order to aid in preventing movement of articles from the sections 12 and 14.

As shown in Figure 9, the utility shelf of this invention as disposed within the glove compartment 46 is used to support numerous items which are usually retained within the glove compartment of an automobile. A plurality of maps 62 are supported by the sections 12 and 14. A memorandum pad 64 is supported on the lower surface formed by the portions 22 of the section 14. A plurality of pencils 66 are retained within the elongate holes 54 of the block member 52.

The sheets of material comprising the sections 12 and 14 are preferably made of a light metal such as aluminum and the like; however, any suitable rigid material is found satisfactory. The brackets 36 and 38 may also be constructed of any desired rigid material such as aluminum and the like. The block 52 may be constructed of a plastic material or wood or other suitable material.

Naturally it is understood that the utility shelf of this invention may be applied to uses other than that of a utility shelf for a glove compartment. The shelf may be used in any location where it is desired to provide an easily mounted adjustable utility shelf. It is also to be understood that the utility shelf of this invention may be made of a plurality of sections which may differ in some respects from the sections 12 and 14 as outlined above.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

Having thus described my invention, I claim:

1. In a shelf comprising a first rigid sheet, the first sheet having a rectangular portion of a given width joined to a rectangular portion of a lesser width, the rectangular portion of lesser width being joined to a second rectangular portion of the given width, the second rectangular portion of given width having a pair of aligned transverse notches adjacent the end thereof forming flaps at one end of the sheet, the portion having the lesser width having a downwardly extending right angle section at one end thereof and an upwardly extending right angle section intermediate the ends thereof thus placing a section of the portion having the lesser width at a lower level than the portions having the given width, there being fold lines joining the portion having a lesser width to the second portion having the given width, the second portion having the given width being disposed above the portion having a lesser width, there being a fold line aligned with the notches at the end of the sheet with the flaps embracing the edges of the downwardly extending right angle section, and a second sheet, the second sheet being slightly wider than the given width of the first sheet, the second sheet having inwardly extending longitudinal flanges slidably embracing the side edges of the portions of the first sheet having the given width, the second sheet thus being slidably attached to the first sheet.

2. In a utility shelf for a glove compartment of an automobile comprising a first rigid sheet, the first sheet being rectangular, there being a pair of downwardly extending right angle portions in the sheet thus providing a section of the sheet which is at a lower level than the other sections of the sheet, there being a 180° fold in the sheet intermediate the ends thereof so that there is an upper section of the sheet disposed above the parallel with the section which is at a lower level, there being a pair of flaps at the end of the section which is disposed above the said lower section, the flaps embracing one of the downwardly extending right angle portions thus securing the upper section of the sheet above the lower section of the sheet, a second sheet, the second sheet being movable upon the upper surface of the first sheet and slidably attached thereto.

3. In a dual utility shelf having an upper support surface and a lower support surface comprising a single rigid substantially rectangular sheet of material, the sheet of material having a first rectangular portion, the first rectangular portion being at one end thereof and of a given width, a second rectangular portion of the given width, the second rectangular portion being adjacent the other end of the sheet, the said two rectangular portions being joined by a reduced portion of a lesser width, the sheet being bent along a transverse line forming a juncture between the first rectangular portion and the reduced portion, thus forming a rectangular downwardly extending section in the part of the reduced portion adjacent the first rectangular portion, the reduced portion having a right angle bend therein at the lower end of said rectangular downwardly extending section, the reduced portion thus having a horizontal area at a lower level than the first rectangular portion, the reduced portion having an upwardly extending section in spaced relation from the first rectangular portion, there being a horizontal section of the reduced portion joining the upwardly extending section to the second said rectangular portion of the given width, the second said rectangular portion being in folded relation with the reduced portion and disposed above the reduced portion with part of the second said rectangular portion in juxtaposed parallel engagement with the last said horizontal section of the reduced portion, the end of the second said rectangular portion of the given width being vertical and having parts thereof embracing the rectangular downwardly extending section formed in the reduced portion adjacent the first rectangular portion of the given width.

References Cited in the file of this patent

UNITED STATES PATENTS

| | | |
|---|---|---|
| 707,546 | Brooke | Aug. 26, 1902 |
| 1,069,411 | Greene | Aug. 5, 1913 |
| 2,657,967 | Gilchrist | Nov. 3, 1953 |

FOREIGN PATENTS

| | | |
|---|---|---|
| 546,838 | France | Sept. 4, 1922 |

U. S. DEPARTMENT OF COMMERCE
PATENT OFFICE

CERTIFICATE OF CORRECTION

Patent No. 2,820,687                                              January 21, 1958

Roger L. Waring

It is hereby certified that error appears in the printed specification of the above numbered patent requiring correction and that the said Letters Patent should read as corrected below.

Column 4, line 27, for "above the" read -- above and --.

Signed and sealed this 1st day of April 1958.

(SEAL)
Attest:

KARL H. AXLINE                                            ROBERT C. WATSON
Attesting Officer                                        Commissioner of Patents